US00RE36876E

United States Patent [19]

Daniels et al.

[11] E Patent Number: Re. 36,876

[45] Reissued Date of Patent: Sep. 19, 2000

[54] PLASTIC BAG WITH PROMOTIONAL STRIP

[76] Inventors: Mark E. Daniels, 510 The Village #307; Joseph L. Wicherski, 520 The Village #308, both of Redondo Beach, Calif. 90277

[21] Appl. No.: 09/344,043

[22] Filed: Jun. 24, 1999

Related U.S. Patent Documents

Reissue of:

[64] Patent No.: 5,882,118
Issued: Mar. 16, 1999
Appl. No.: 08/845,269
Filed: Apr. 24, 1997

U.S. Applications:

[60] Provisional application No. 60/030,381, Nov. 5, 1996.

[51] Int. Cl.[7] ..... B65D 33/10

[52] U.S. Cl. ..... 383/8; 40/626; 40/662; 40/654.01; 206/831; 229/70; 383/120; 383/127

[58] Field of Search ..... 206/831, 554; 383/120, 104, 127, 7, 8, 62; 40/626, 662, 654.01; 229/70

[56] References Cited

U.S. PATENT DOCUMENTS

| | | | |
|---|---|---|---|
| 2,303,296 | 11/1942 | Avery | 229/70 X |
| 3,804,323 | 4/1974 | Bemel | 383/127 X |
| 4,537,586 | 8/1985 | Gale et al. | 493/220 |
| 4,597,749 | 7/1986 | O'Brien et al. | 383/8 X |
| 4,909,636 | 3/1990 | De Matteis et al. | 383/8 |
| 5,011,466 | 4/1991 | De Matteis et al. | 493/188 |
| 5,035,515 | 7/1991 | Crossman et al. | 206/831 X |
| 5,441,348 | 8/1995 | Valentino | 383/127 |
| 5,513,914 | 5/1996 | Faber | 383/127 X |

FOREIGN PATENT DOCUMENTS

| | | | |
|---|---|---|---|
| 347522 | 12/1989 | European Pat. Off. | 206/554 |
| 1354954 | 5/1974 | United Kingdom | 383/127 |
| 2074541 | 11/1991 | United Kingdom | 383/127 |

*Primary Examiner*—Stephen K. Cronin
*Assistant Examiner*—Robin A. Hylton
*Attorney, Agent, or Firm*—William H. Pavitt, Jr.; David A. Belasco; Natan Epstein

[57] ABSTRACT

Gusseted plastic bags and methods of making the same in either rolls or stack packs, each bag having at least one plastic promotional strip extending along a side edge of the bag and secured adjacent to top and bottom edges. The promotional strip may be disposed either between the folded bag edges forming the gusset or outside of the gusset, and may or may not be perforated.

7 Claims, 4 Drawing Sheets

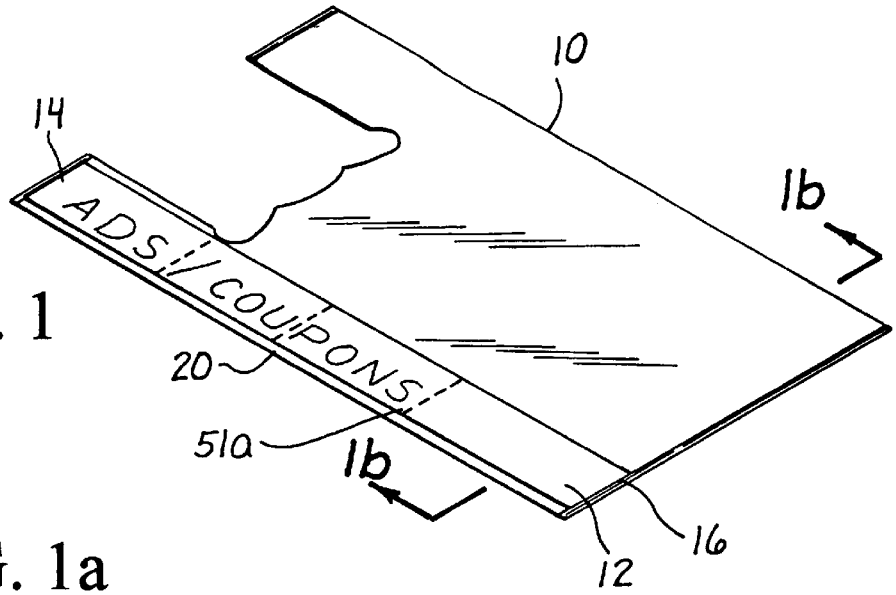
FIG. 1
FIG. 1a
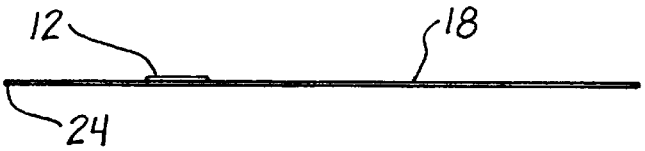
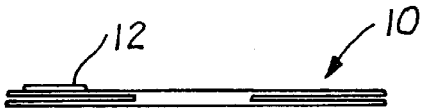
FIG. 1b
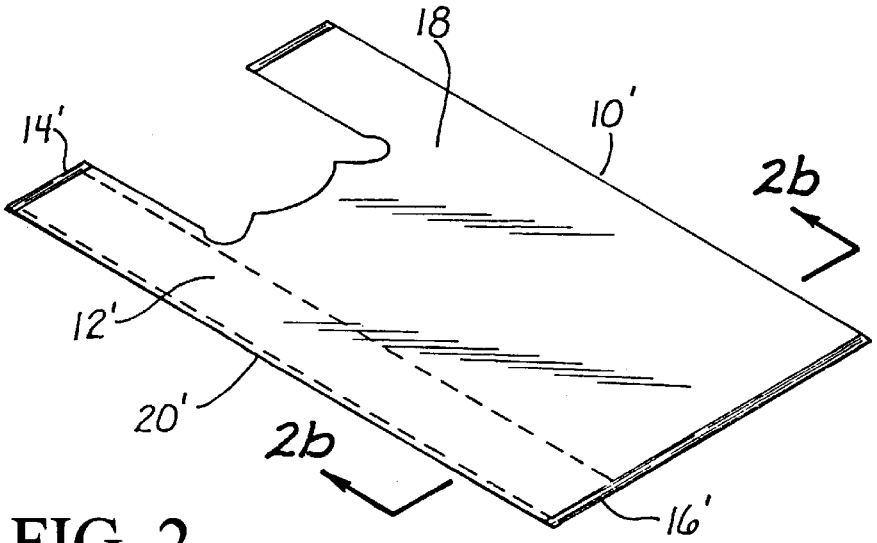
FIG. 2

FIG. 3
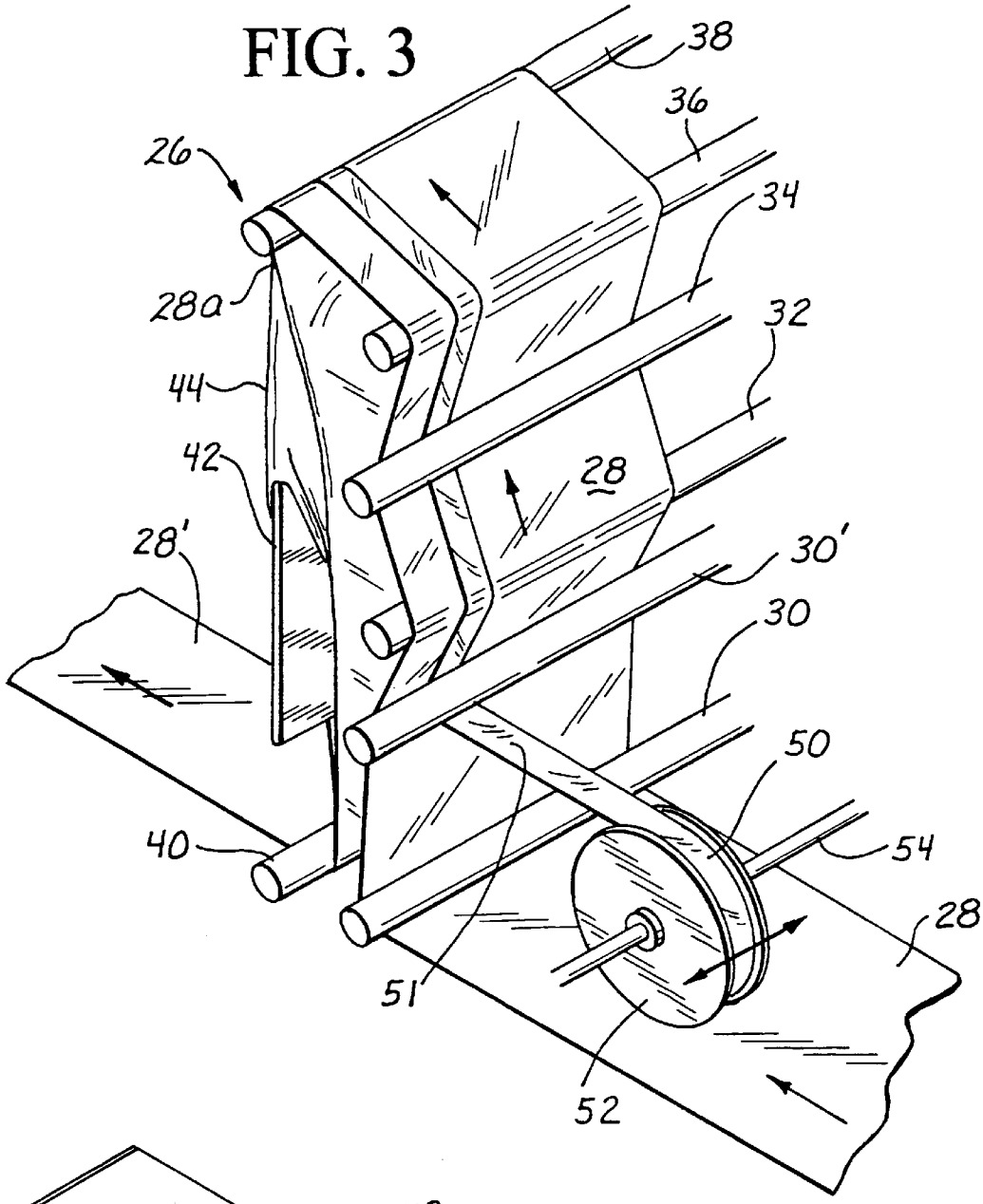
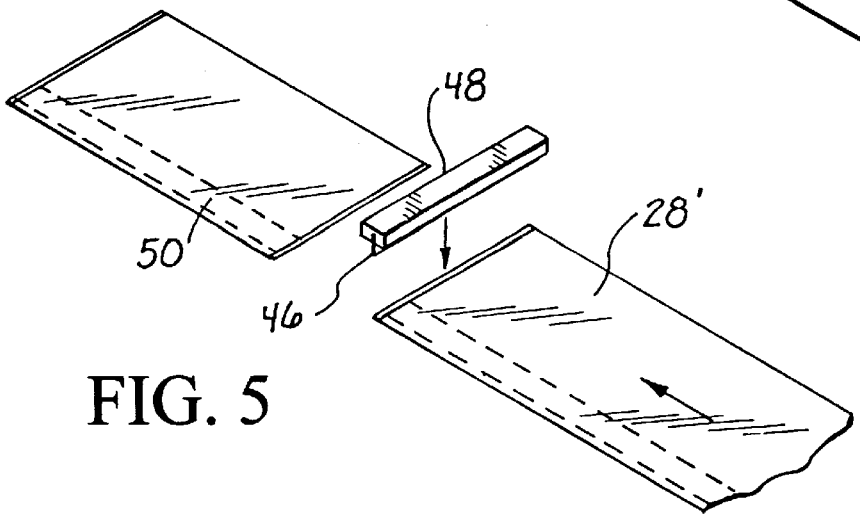
FIG. 5

FIG.6
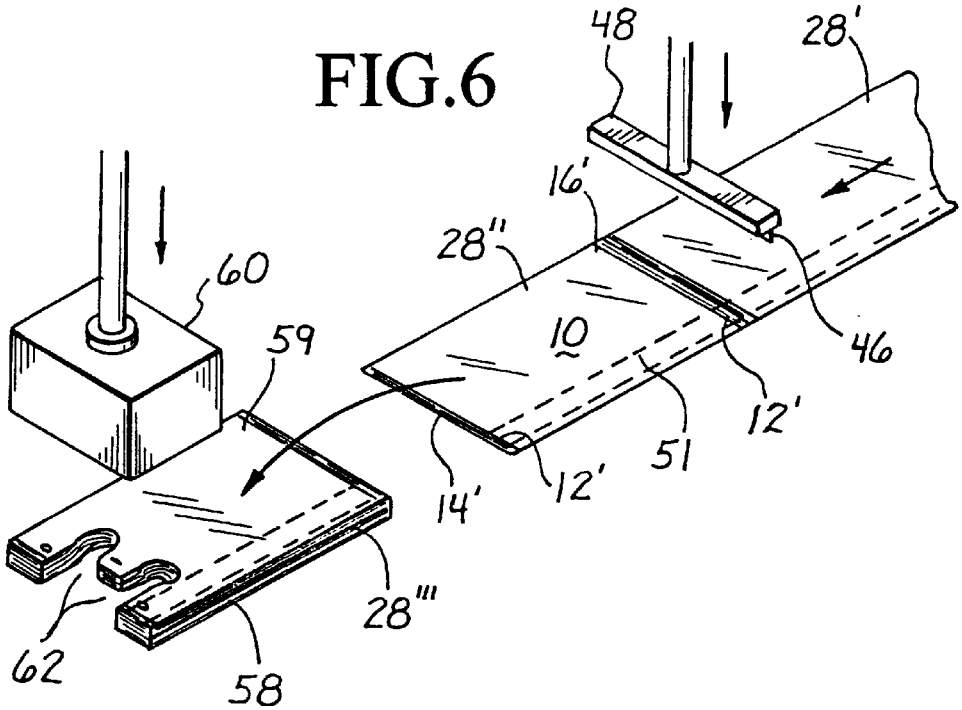
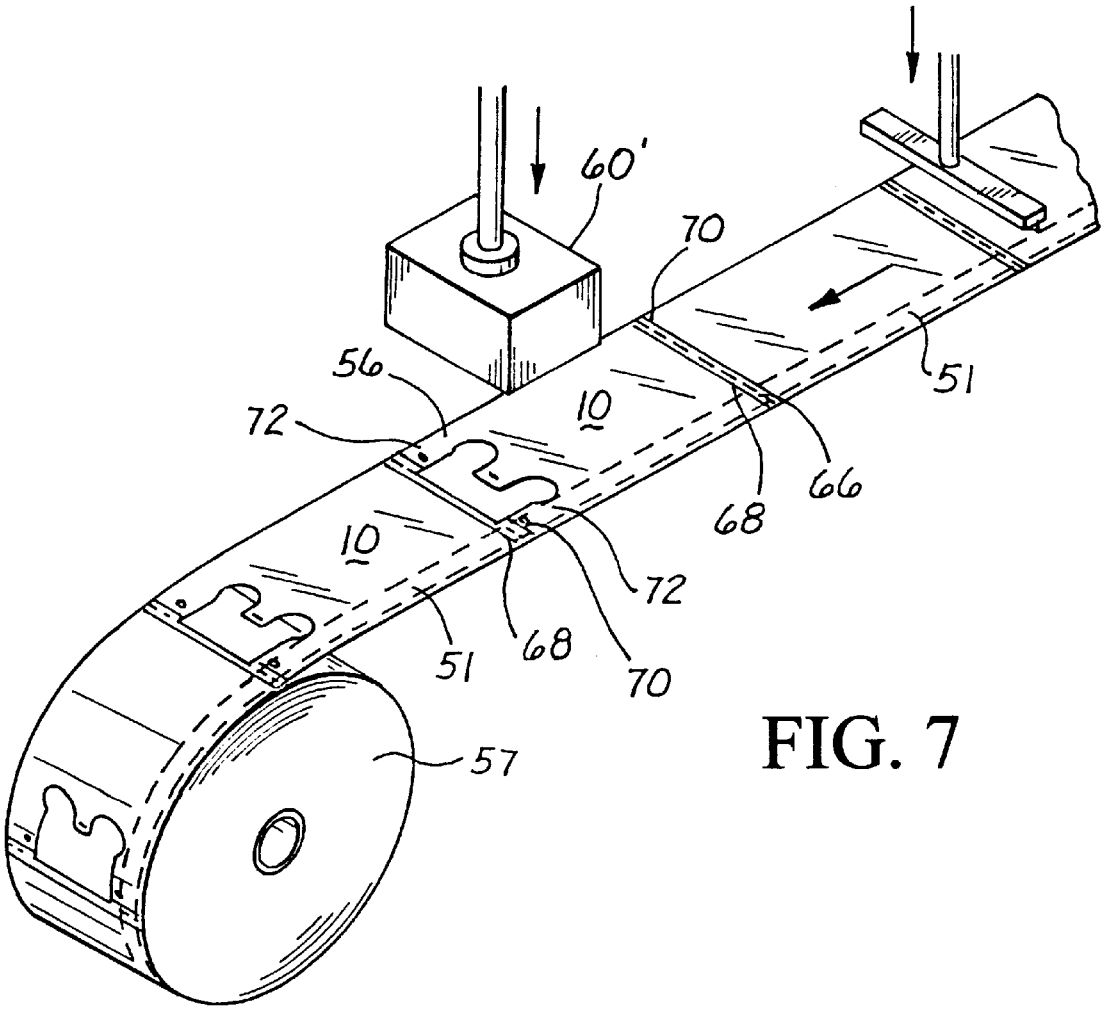
FIG. 7

PLASTIC BAG WITH PROMOTIONAL STRIP

Matter enclosed in heavy brackets [ ] appears in the original patent but forms no part of this reissue specification; matter printed in italics indicates the additions made by reissue.

The present application is a continuation-in-part of provisional application Ser. No. 60/030,381, filed Nov. 5, 1996.

FIELD OF THE INVENTION

This invention relates to the field of plastic bags of the type employed by retailers in packing food items and other merchandise, with particular application to T-shirt type merchandise bags.

BACKGROUND OF THE INVENTION

Annual usage of plastic bags by U.S. retailers is estimated to exceed 50 billion units. A certain percentage of these bags may be ordinary rectangular bags having various features, but a large percentage of the bags so used are what is known as T-shirt type merchandise bags (bags which have handles projecting upwardly on each side from the mouth of the bag).

Efforts have been made almost from the introduction of plastic bags to provide some type of advertising, discount or coupon strips on T-shirt or other plastic bags.

In some instances, these efforts have taken the form of adhesively applied labels or strips as may be seen from U.S. Pat. Nos. 5,363,966 and 5,298,104.

In other cases, the strips have been overlaid on the bag film or applied transversely to the bags as may be seen in Pat. Nos. 3,804,323, 5,242,365, and 5,363,966.

In still other expedients, advertising strips have been overlaid or underlaid with respect to the basic bag forming See: U.S. Pat. Nos. 3,209,386, 3,744,383, 4,120,716, 4,182, 222, 4,268,344, 4,537,586, 4,726,171, and 5,011,466.

In one instance, namely U.S. Pat. No. 5,369,936, a "banner" has been applied along the side edges of plastic rectangular bags and sealed as a part of a rectangular bag forming and filling process.

In no instance of which the present inventors are aware have detachable coupon or promotional strips been provided along the sides of T-shirt bags, and particularly within the gussets of such bags.

Heretofore, there have only been two ways to put advertising/promotional messages on plastic bags: (1) advertising and/or coupons could be printed on the walls of the bags themselves or (2) in the case of certain rectangular bags, as contrasted with T-shirt bags, detachable promotional strips may be attached to the lower edges of the bags. Such promotional strips sometimes are in the form of coupons which can be redeemed for price discounts or special items offered by the retailer.

These advertising strips and/or coupons have been formed during the process of manufacturing rectangular bags as transverse attachments along the bottom edges of bags made in lay-flat form. When bags are made in roll form, the advertising strip and/or coupons can be formed along one side edge of a printed film web as it moves in the machine direction. On these roll bags, the advertising/coupon strip, the bottom seal of each individual bag and any perforations below the bottom seal are all formed along the side edge of the film web.

For both the lay-flat and roll forms, the advertising strip and/or coupons are created during the manufacturing process by printing on predetermined areas of the film web prior to its arrival at the sealing, perforating and cutting areas where the film web is converted into finished lay-flat or roll bags. In both cases, the bags are sealed at the bottom and may be perforated below the seal to permit the advertising strip and/or coupons to be easily torn from the bottom of the bag. In the case of bags on rolls, additional steps are required. Side seals and a second (transverse) perforation are made in the film web between the trailing side of the first bag and the leading side of the following bag so that one bag can be easily separated from another.

While these processes may be employed in the manufacture of rectangular open-topped bags, they are not suited for the manufacture of either lay-flat or roll T-shirt type bags where the cutting process to form the handles and mouth of each bag does not accommodate the creation of a transverse strip across the bottom of each bag. The manufacturing process requires both the top and bottom of each T-shirt bag to be sealed before the cutting process forms the top of the bags. In the case of T-shirt bags on rolls, an additional step is required where perforations are placed between the sealed bottom edge of one bag and the sealed top edges of the handles of the adjoining bag. These perforations are necessary so that each bag can be easily torn from the roll of bags.

Thus, the only way, heretofore, for providing coupons on T-shirt bags has been by printing advertising and/or coupons on the outside of the bag walls, as may also be done with open-top rectangular bags, or by using adhesive strips which bond to the surface of the bags. This latter process slows production and increases costs. It also makes packaging appear untidy and obscures printed graphics on the bags. Advertising and/or coupons printed on bags must be cut out of the bag walls by customers using a scissors or knife. Not only is this requirement a nuisance and inconvenience to the customer, but also quite often the presence of such advertising and/or coupons may be overlooked by the customer who is usually more interested in what has been placed in his or her bag than in what may appear on the bag side wall. Bags with advertising and/or coupons printed on their walls also have the disadvantage of being unsuitable for secondary usage around the home after their side walls are cut to remove the printed messages. Very importantly, printing advertising and/or coupons on the bag walls also detracts from the store's printed graphics, which is a serious disadvantage to the retailer.

Because T-shirt bags represent something in excess of ⅔'s of all plastic bags employed by U.S. retailers to pack food and other merchandise, it would be most desirable to provide for the removable attachment to T-shirt bags of some type of advertising or coupon strips which could at least be viewed and conveniently removed by the retailer's customers whose purchases are packed in such bags and which would not interfere with, or detract from, the graphic designs printed on retail bags.

SUMMARY OF THE INVENTION

The present invention provides advertising and/or coupon strips along the sides, and preferably within the gusset folds of T-shirt bags, the strips being sealed at both ends to the top of the handles and to the bottom edges of the bags, and further involves the method by which this may be accomplished. This method involves providing at least one roll of a pre-printed narrow film strip, but of a width sufficient to accommodate printing in the form of advertising and/or coupons, and feeding the tape from such roll disposed parallel to the main film web at a selected point in the bag-making process along the tubing edges before sealing of the handles and the bottom edges takes place as, for example, just before, or as, the bag gussets are being formed. The narrow tape is fed to be laid on top of the film web to be converted into finished bags and compressed against it as the film web moves toward the converting stations. By properly feeding the narrow strip onto the edge of the tubing just prior to gusseting, when gusseting occurs, the narrow strip will be disposed within the gusset after the latter is formed, and will then be sealed at its ends with the film as the film passes the sealing station, along the same transverse line as the tops of the handles and the bottom edges of the T-shirt bags are sealed, and then cut into blanks for stacking and die-cutting to form a pack of lay-flat T-shirt bags; or alternatively, perforated transversely of the sealing station and passed under a rotary or a die-stamp cutter to produce roll-form T-shirt bags. Also the advertising/coupon strip can be inserted into the gussets on either side of the bag after gusseting has taken place, but prior to the sealing process.

While it is preferred that the narrow strip roll be fed in such a manner that, following the gusseting operation, the strip or strips will appear within the gussets, it would also be possible, within the contemplation of the present invention, to feed the strips in such a manner that they appear outside the gusset folds. However, if the advertising and/or coupon strips are disposed between the gusset walls, there is less likelihood of the strips being caught on the packer's hands in the course of removing the bags from the conventional dispensing rack from which most T-shirt bags are commonly dispensed, or on shopping carts. In addition, message strips placed inside the gusset folds do not interfere with the graphic designs printed on retailers' bags.

In the practice of the present invention, the advertising and/or coupon strip can be, but does not have to be, either of the same material, or be subject to the same film color or print limitations as are the bags to which the strip is attached. It is only necessary that the message strip be of a material which is compatible with the process by which the bags are sealed. Thus, the strips attached to polyethylene bags may be made from, but not limited to, low-density polyethylene, linear-low-density polyethylene or high-density polyethylene. Where the strip is made of a different color material or with a different print design or ink colors from the bags, the strip will provide a more-effective visual impact for promotional messages.

When the printed strip provides images of a highly visible, highly noticeable quality, consumers will be more likely to notice the message strip, increasing the probability that they will pull off and retain the strip or coupons, where they may otherwise simply discard the bags. Further, because the strips are only secured to the bags at the ends of each strip, the messages or coupons are easily detached by a relatively light hand pull. Message and/or coupon removal can be facilitated by placing perforations between each message and/or coupon in the printed film strip. This makes the advertising messages and/or coupons even easier to remove from the strip, whether it is affixed inside or outside the bag gussets.

The present invention, thus, may be seen to overcome certain disadvantages in attempts to advertise by printing on the walls of plastic T-shirt bags themselves. Among such disadvantages is the fact that few people stop to read printing on the outside walls of T-shirt bags which have come into their possession filled with food items or merchandise. Consequently, even valuable information or coupons printed on the walls of T-shirt bags may be easily overlooked. Where coupons or other types of promotional items are printed on T-shirt bags, or on rectangular bags or attached along the lower edges of rectangular bags, they may get visually lost in the total print design. If coupons are printed on the outer bag walls, not only is printing generally of a poor quality and much less likely to be noticed, but also having to cut coupons from bag walls is an inconvenience for the customers and requires the availability of a scissors or at least a sharp knife.

The present invention, therefore, offers many advantages over prior art expedients from an advertising and promotional standpoint for the plastic bag industry and for the advertisers and retailers.

DESCRIPTION OF THE DRAWINGS

In the accompanying drawings,

FIG. 1 is a perspective view of a T-shirt bag having an advertising or coupon strip removably disposed along one side edge of the bag.

FIG. 1a is a transverse section of a T-shirt bag in the course of being fabricated prior to gusseting.

FIG. 1b is a section taken along a line 1b 1b of FIG. 1.

FIG. 2 is a perspective view of a T-shirt bag in which an ad or coupon strip has been inserted in the gusset during the course of its fabrication.

FIG. 3 is a perspective view of the portion of the bag making apparatus where the advertising or coupon strip is applied just prior to the formation of the bag gussets.

FIG. 5 is a representation of the next stage of the bag making process following the film's path after what is shown in FIG. 3.

FIG. 6 illustrates the next step of the method after FIG. 5 where the bags are formed in packs.

FIG. 7 illustrates the next step of the method where the bags are disposed upon rolls.

DESCRIPTION OF THE PREFERRED EMBODIMENT

Figure 2A:
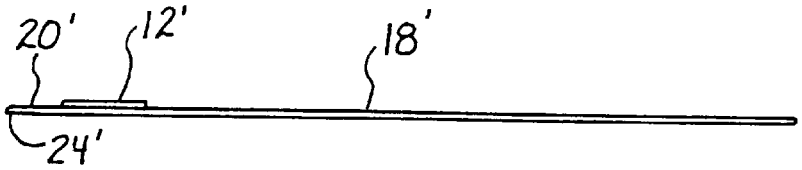
FIG. 2a is a sectional view similar to FIG. 1a but showing the disposition of what will become the advertising or coupon strip during the course of fabricating a T-shirt bag of the type shown in FIG. 2.

In FIG. 1, there is shown a T-shirt type bag 10 on the left side of which has been superimposed an ad or coupon strip 12. The strip 12 is sealed to the handle end 14 of the bag 10 and to the bottom 16 of the side edge 20. In FIG. 1a there is shown in section the manner in which the strip 12 may be laid on the bag film 18 which, after being gusseted, will appear as shown in cross-section in FIG. 1b. It may be seen that in this embodiment, the ad or coupon strip is disposed along the outside of the edge 20 of the bag 10.

Figure 2B:
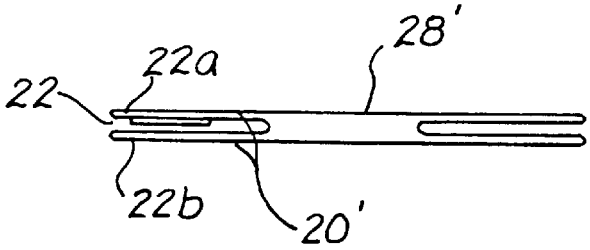
FIG. 2b is a section taken on a line 2b 2b of FIG. 2.

FIGS. 2, 2a, and 2b correspond to FIGS. 1, 1a, and 1b, but reveal the preferred embodiment in which the coupon strip 12' is disposed within the gusset 22. To accomplish this disposition of the strip 12' on the film 18' before gusseting, it will be noted that the strip 12' is placed on the film 18' closer to its left edge 24' than the strip 12 is placed relative to the film edge 24 in FIG. 1a.

FIG. 3 of the drawings illustrates a possible station which may be employed in the normal production of T-shirt type bags. As may be seen, the flattened film web 28 is moving into rollers 30, 30' which direct the film upwardly to be passed over further rollers 32, 34, 36, and 38. As the tubular film 28 passes over roller 38 and is brought down to and under roller 40, it is intercepted by the gusseting members 42, which, in effect, narrows the width of the tube 28 by forcing the blown open edges 44 over the angular gusseting members 42. After the gusseting has thus been accomplished, the now gusseted tube 28' may move on for sealing, perforating and cutting, as shown schematically in FIGS. 5, 6 or 7. It will be appreciated by those skilled in the plastic bag manufacturing process and in devising equipment therefor, that more or fewer rollers than those which are shown in FIG. 3, may be provided for the practice of the present invention.

Figure 4:
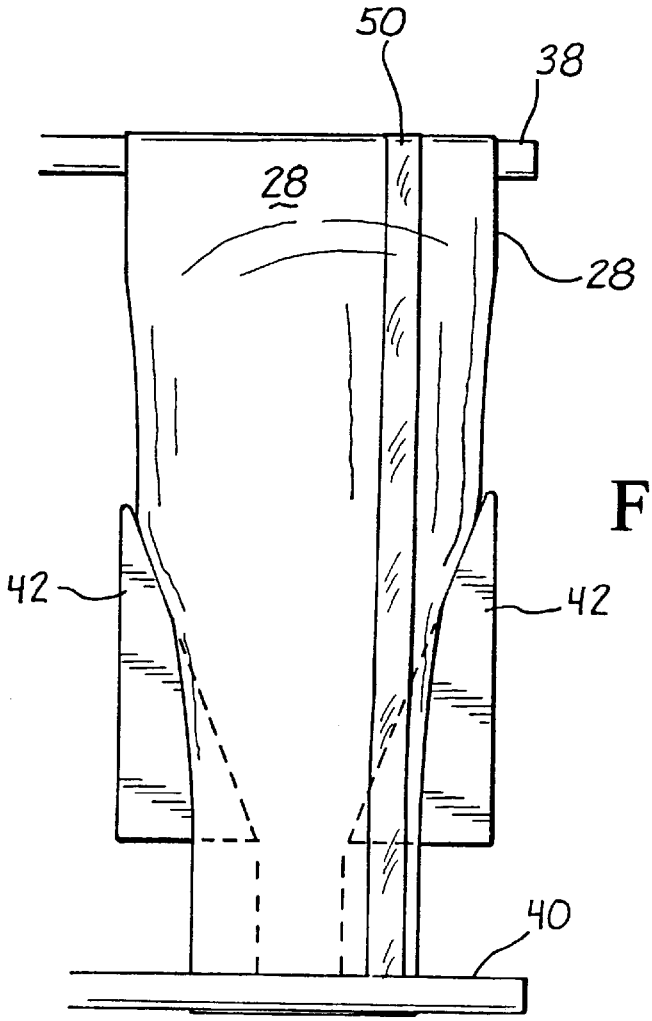
FIG. 4 is a view of the back face of the machine shown in FIG. 3.

What has been described with reference to FIGS. 3 and 4 of the drawings is a conventional form of gusseting station, which may be found in some types of bag making apparatus. In order to practice the present invention, however, in conjunction with such a gusseting station, a roll 50 of a narrow promotional coupon strip 51 of plastic material, such as low-density polyethylene, linear-low-density polyethylene, or high-density polyethylene, may be carried on a spool 52, disposed to rotate with or about a shaft 54, proximately placed parallel to at least the upper of the two rollers 30, 30'. In effect, the strip 51 is fed under roller 30' and laid upon the film 28 as it is pressed against rollers 30', 32, 34, 36, and 38. When the film 28 is moved between rollers 38 and 40 for gusseting, as the edges 28a of the film 28 are opened up, the strip 51 is fed into the opened-up edges 44, so that, when the two halves of the edges 44 are brought together to form a gusset, the coupon strip 51 will be disposed between the two of what have then become the divided edge 20' (FIG. 2) of the narrowed (through gusseting) tube 28'.

As pointed out previously in connection with the discussion of FIGS. 1, 1a, and 1b, it is also possible to lay the strip 51 on the outside of the gusseted edge 20, to appear as 12 in the latter figures. It should be clearly understood that what has been described with reference to FIG. 3 of the drawings is but one way of attaining the desired result, the strip 51 could be fed at a different point in the path of the film 28—particularly if the number of rollers in such path is different, or the rollers are differently arranged.

While, as a result of being pressed against the film 28 as it moves over the rollers, such as 30', 32, 34, 36, and 38, there may be some slight compression bonding between the strip 51 and the film tube 28'. even after being compressed between the gusset walls 44 after moving over roller 40, the strip 51 will only be lightly adhered within the final gusset 22 (22a and 22b of FIG. 2B).

Where the bags are to be made up into packs 58 as illustrated in FIG. 6, the tubing 28 may be cut by the blade 46 into blanks 28" and simultaneously heat-sealed by the bar 48, which, in the illustrated embodiment, may also carry the cutting blade 46. After cutting and sealing the blanks 28", the latter may be piled into a stack 59 which is subjected to a die cutter 60 to cut out the upper openings 62 in the stack 59 to produce a bag pack 58 of a predetermined number of bags 28'''.

However, where the bags are to be wound on rolls 57, instead of being stacked as a pack 58, the bag-conversion process differs, with the top 56 of each bag 10 being formed individually, after top and bottom sealing, with either a rotary (not shown) or die-stamp cutter 60' and with perforations 66 being placed between the bottom seal 68 of one bag and the top edge 70 of the handles 72 of the adjoining bag.

The ends 12' of the strip 51, however, as a result of heat-sealing by the bar 48, will be adhered to the ends 14' and 16 of the bag 10. Consequently, when the T-shirt bag 10 is opened up, the strip 51 may flutter against the open gusset walls 22a, 22b, but will be securely held in that posture by the sealed ends 14' and 16'.

The strip 51 may comprise a series of advertising messages and/or coupons, separable from each other along perforated lines 51a with a light hand pull, with or without perforations 51a; or the entire strip 51 may either feature special advertising; or may be in the form of some type of coupon or premium which may be ripped off the bag at its edge ends 14, 16'.

The strip 51 may take many forms and may be of a material which is different from that of the plastic tube 28. The only requirement for the strip 51 is that it be compatible with the material of the plastic tube 28, so that the ends of the final strip 51 may be sealed at 14 and 16 on the end product bag 10.

The present invention, thus, provides for the fabrication of T-shirt type bags which may have detachable advertising or coupon strips—a feature not heretofore possible with such

What is claimed is:

1. A plastic T-shirt bag formed by front and back walls secured together along their side and bottom edges, the sides of each of the walls being folded inwardly towards each other to form *a* gusset, said bag walls having an upper centrally located cut-out to define a bag-mouth, the portions of the bag walls on each side of the cut-out being secured along their top edges to comprise handles; and a promotional strip disposed within at least one gusset extending up to the upper edge of a handle, said strip being of a length coinciding with the length of the bag walls and being secured at the opposite ends of the said strip to the bottom edges of the walls and the top edge of the at least one gusset and handle, said strip being detachable upon the opening of the gusset.

2. The plastic T-shirt bag as described in claim 1, wherein the promotional strip disposed within the at least one gusset is comprised of a plurality of sections joined end-to-end and between each pair of which sections is provided a transverse perforation line, thereby permitting the sections on each side of the line more easily to be separated from each other by tearing along such perforation line.

3. A plastic T-shirt bag formed by front and back walls secured together along their side and bottom edges, the sides of each of the walls being folded inwardly towards each other to form gussets, said bag walls having an upper centrally located cut-out to define a bag mouth, the portions of the bag walls on each side of the cut-out being secured along their top edges to comprise handles; and a promotional strip disposed in abutment with a side edge surface including a handle, said strip being of a length to extend between and being secured at the opposite ends of said strip to, the bottom edges of the walls and the top edge of the handle with which the strip is in abutment, said strip being detachable upon pulling its ends from the bottom wall edges and handle edge.

4. The plastic T-shirt bag as described in claim 3, wherein at least one side edge of the bag is gusseted and the promotional strip is disposed within the gusset and is comprised of a plurality of sections joined end-to-end and between each pair of which sections is provided a transverse perforation line, thereby permitting the sections on each side of the line more easily to be separated from each other by tearing along such perforation line.

5. The plastic T-shirt bag as described in claim 3, wherein at least one side edge of the bag is gusseted and the promotional strip is disposed on the outside of the gusset, said strip being comprised of a plurality of sections joined end-to-end and between each pair of which sections is provided a transverse perforation line, thereby permitting the sections on each side of the line more easily to be separated from each other by tearing along such perforation line.

*6. A plastic T-shirt bag formed by front and back walls secured together along their side and bottom edges, at least one of the secured together side edges of the walls being folded inwardly to form a gusset, said bag walls having an upper centrally located cut-out to define a bag mouth, the portions of the bag walls on each side of the cut-out being secured along their top edges to comprise handles; and a promotional strip disposed within said at least one gusset extending up to the upper edge of the handle, said strip being of a length coinciding with the length of the bag walls and being secured at the opposite ends of said strip to the bottom edges of the walls and to the top edge of the gusseted handle, at least a portion of said strip being detachable upon the opening of the gusset.*

*7. A plastic T-shirt bag formed by front and back walls secured together along their side and bottom edges, the sides of each of the walls being folded inwardly towards each other to form gussets, said bag walls having an upper centrally located cut-out to define a bag mouth, the portions of the bag walls on each side of the cut-out being secured along their top edges to comprise handles; and at least one promotional strip disposed in abutment with a side edge including a handle, said strip being of a length to extend between and being secured at the opposite ends of said strip to the bottom edges of the walls and the top edge of the handle with which the strip is in abutment, at least a portion of said strip being detachable.*

* * * * *